United States Patent [19]

Honigsbaum

[11] Patent Number: 5,177,316
[45] Date of Patent: Jan. 5, 1993

[54] PROCESS AND APPARATUS FOR ATTACKING ROTATING WING AIRCRAFT

[76] Inventor: Richard F. Honigsbaum, A-21 Barry Gardens, 245 Passaic Ave., Passaic, N.J. 07055

[21] Appl. No.: 643,799

[22] Filed: Jan. 18, 1991

[51] Int. Cl.⁵ .............................................. F42B 12/68
[52] U.S. Cl. ...................................... 89/1.11; 102/405
[58] Field of Search .................. 89/1.11; 102/404, 405; 244/3.15

[56] References Cited

U.S. PATENT DOCUMENTS

| | | | |
|---|---|---|---|
| 2,407,330 | 9/1946 | Turner, Jr. | 181/26 |
| 2,766,713 | 10/1956 | Kelsay | 114/23 |
| 3,009,525 | 11/1961 | DeLiban | 180/82 |
| 3,496,527 | 2/1970 | Ziehm et al. | 340/11 |
| 3,838,642 | 10/1974 | Shimberg | 102/404 |
| 4,409,899 | 10/1983 | Owen et al. | 102/211 |
| 4,625,646 | 12/1986 | Pinson | 102/489 |
| 4,656,945 | 4/1987 | Stancil | 102/405 |
| 4,679,504 | 7/1987 | Carpenter | 89/1.11 |

OTHER PUBLICATIONS

"Transformer Engineering" by L.F. Blume et al., pp. 475 and 477 (Wiley & Sons, N.Y. 1951).
Encyclopedia of World Military Weapons (Crescent Books, N.Y. 1988) pp. 156–157, 160, 172, 197, 202–204, 206 and 208.

Primary Examiner—Charles T. Jordan
Attorney, Agent, or Firm—Cohen, Pontani, Lieberman, Pavane

[57] ABSTRACT

The missiles of the present invention are guided toward the rotating wing aircraft that are their targets by acoustic guidance and control systems that home in on the acoustic signatures of their targets, and that do so despite echoes, the acoustic signatures of other weapons, targets hidden by the terrain during nap-of-earth flight, etc., and attack their targets by deploying cables that are impacted by the rotor blades of these rotating wing aircraft. These cables are deployed close enough to their targets to defect maneuvers intended to avoid them by deployment initiated by the change in intensity of the perceived acoustic signatures of the targets.

The missiles of this invention can also be made self-launching, and when the launch triggers that make them so are responsive to the acoustic signatures of their targets, those protected from line-of-sight weapons by the terrain become vulnerable to these "mines".

13 Claims, 4 Drawing Sheets

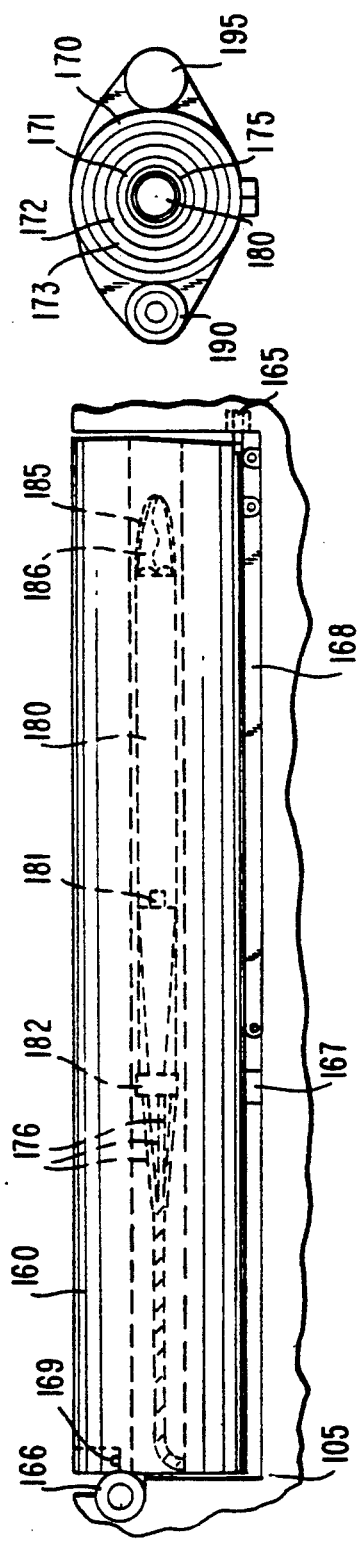

PROCESS AND APPARATUS FOR ATTACKING ROTATING WING AIRCRAFT

BACKGROUND OF THE INVENTION

1. Field of the Invention

This invention relates to weapons for attacking rotorcraft and more particularly to weapons that home in on the acoustic signatures of these craft and then attack their targets by deploying cables that break or foul rotor blades and/or their pitch adjustment mechanisms.

2. Prior Art

Rotating wing aircraft have become effective instruments of modern warfare not only because of their maneuverability, but also because they are shielded from conventional line-of-sight weapons that are aimed and/or guided optically, or by radar or infrared during nap-of-earth flight, and can limit their exposure above that shield to times too short to accommodate effective aiming and firing of these line-of-sight weapons. Such craft are, however, ideal targets for acoustically guided weapons, not only because their distinctive acoustic signatures are recognizable despite nap-of-earth flight, but also because acoustically guided weapons can, despite limits imposed by acoustic guidance systems, fly faster than rotating wing aircraft because these craft are limited to even lower speeds by the loss of lift that occurs when advancing blades approach sonic velocity.

Weapons responsive to acoustic signatures are well known from the art of naval warfare, and Kelsay, U.S. Pat. No. 2,766,713, discloses a *Torpedo-Steering Control System* in which the outputs of a pair of axi-symmetrically displaced microphones are compared, the position of the torpedo rudder being adjusted to make the acoustic signals at both microphones the same. While Kelsay's arrangement addresses only yaw, three-dimensional steering can obviously be effected by adding a second such system, the microphones and control surface or surfaces of which are orthogonal with respect to the first. Alternatives to Kelsay's two-microphone arrangement are also known, and Turner, U.S. Pat. No. 2,407,330, discloses a system for determining the bearing of an acoustic source by rotating a single directional microphone, and Ziehm et al, U.S. Pat. No. 3,496,527, disclose a single transducer assembly that fixes direction but does not require rotation.

Prior art acoustically guided weapons are typically torpedoes, the targets of which are ships, submarines, etc., the hulls of which are large contiguous acoustic radiators that are effectively attacked by impact-detonated weapons that home in on the acoustic signatures of their targets. Rotating wing aircraft are, on the other hand, mostly "open space", and the rotating blades, which describe a large circle and are the most vulnerable elements of these craft, occupy only a small portion of that circle at any particular instant of time. Further, the characteristic acoustic signatures of such craft are partially the result of the slap that results when the retreating blade loses lift and partly the result of blade-fuselage interaction, and neither of these dominant effects emanates directly from a well defined acoustically targetable point. Thus acoustically guided anti-rotorcraft weapons must either close optically or by infrared or radar, each of which has countermeasures, be detonated by proximity and carry a large enough warhead to be effective at a distance, or as preferred here, by deploying cables that break and/or foul rotor blades and/or their pitch-adjusting mechanisms.

Cables were suspended from balloons for protection against aircraft during World War II, but such arrangements would not be effective now because they are radar-detectable, and once detected are easily avoided by craft as maneuverable as helicopters.

Cable assemblies have also been proposed as "kinetic kill" defenses against ICBMs, the cable assemblies being deployed as rotating arrays with their planes of rotation normal to the paths of these missiles. This rotation not only maintains the collision cross-section of the array, but also facilitates the destruction of missiles that, because of their shape, might otherwise pass between the elements of that array. Cables that are deployed to destroy rotating wing aircraft do not have to be rotated, however, because these craft have adequate collision cross-sections that result from rotation of their most vulnerable elements. Because the plane of that rotation is substantially horizontal, the cables of the present invention are deployed in substantially vertical configurations that are more effective against their targets.

These substantially vertical configurations are not established instantaneously, however, and cannot be deployed well in advance of arrival of their targets for reasons mentioned earlier, so that circuitry, the prototype for which is that disclosed by Owen et al, U.S. Pat. No. 4,409,899, is used to initiate cable deployment early enough to attack targets most effectively.

In one embodiment of this invention, cables are deployed from their carrier missiles by rockets, and Pinson, U.S. Pat. No. 4,625,646, discloses an arrangement in which submissiles are deployed from carrier missiles. Pinson's submissiles, however, not only deploy no cables, but are launched with a rearward orientation with respect to the carrier missile, so that, even if cables were to be deployed by Pinson's submissiles, the cables would be ineffective because they would be parallel to rather than normal to the planes of rotation of rotorcraft rotors.

The missiles of this invention travel at subsonic velocity, at least during the acoustically guided portion of their flight, and for this reason they are patterned after anti-tank rather than anti-aircraft missiles, and the anti-tank missiles of particular relevance to the present invention are the HUGHES BGM-71 TOW that has folding winglets and tail fins and a two stage propulsion system, and the MCDONNEL DOUGLAS M47 DRAGON that has sequentially fired sustainer rockets. These prior art anti-tank missiles are described in *The Encyclopedia of World Military Weapons*, Bishop, C. & Drury, I. Crescent Books, New York, 1988, pp 203-4.

SUMMARY OF THE INVENTION

According to the present invention I have developed weapons for attacking rotating wing aircraft that home in on the acoustic signatures of these craft and attack them by deploying cables that break or foul rotor blades and/or their pitch adjusting mechanisms.

According to a preferred missile embodiment of this invention, rocket-propelled cable-deploying warheads are guided toward their targets, rotating wing aircraft, by acoustically passive guidance systems that not only home in on the acoustic signatures of their targets, but also distinguish between actual targets and their echoes on the basis of the richer harmonic content of the former. This spectral technique for distinguishing targets from echoes is particularly important because targets cannot be distinguished from echoes on the basis of the later arrival of echoes when targets maintain constant rotor velocity. This technique, which can also be used to distinguish target signatures from those from small weapons fire, etc., makes possible successful attack on rotating wing aircraft that are heard but not seen, and thus removes the protection previously provided by nap-of-earth flight.

The missiles of this invention attack their rotorcraft targets in one of three ways; by direct impact, by deploying cables in destructive proximity to the rotors, and by deploying cables in the expected flight path of their targets. While the first of these merely requires impact actuation of the target destroying means, the other two work best when cables are deployed early when the missile approaches its target head on, and late when the approach is from behind, and circuitry is introduced to do this.

The preferred embodiments of this invention attack targets by deploying cables that break and/or foul the rotor blades and/or the pitch adjusting mechanisms of these blades, and this requires cables that are long enough, strong enough, and deployed in arrays disperse enough to be effective, requirements that are mutually contradictory when missile weight limitations are considered. In this invention, however, these apparently contradictory requirements are addressed by using special twisted or braided cable that can survive both the shear and the tensile loads imposed by blade impact, and by deploying this special cable as "Y" arrays the planes of which are normal to the planes of rotation of the rotor blades of the targets.

While the primary weapons of the present invention are acoustically guided cable deploying missiles that are launched either manually or as anti-rotorcraft "mines" that self-launch in response to the acoustic signatures of approaching targets, warheads in accordance with this invention can alternately be delivered to whithin destructive proximity to their targets as barrel-launched projectiles or as bombs dropped from other aircraft, the trajectories of these alternate arrangements being fixed at the time of launch, or adjusted on the basis of acoustic signatures emanating from targets.

Also within the contemplation of the present invention are weapons combining acoustic and line-of-sight guidance systems, the former guiding these weapons toward their targets when the latter are blinded, say by nap-of-earth flight, weapons having warheads in which conventional target-destroying means complement or replace the cable arrangements, weapons having friend-or-foe distinguishing systems, etc. These, as well as additional features, modifications, and advantages of the present invention are more fully described with reference to the annexed drawings of the preferred embodiments thereof.

BRIEF DESCRIPTION OF THE DRAWINGS

In the drawings:

FIG. 1A is a fragmentary elevational view of the missile of FIG. 1, broken away to show the upper cable storage chamber;

FIG. 1B is a fragmentary elevational view looking into the right hand end of the cable storage chamber shown in FIG. 1A;

DETAILED DESCRIPTION OF THE PREFERRED EMBODIMENTS

Figure 1:
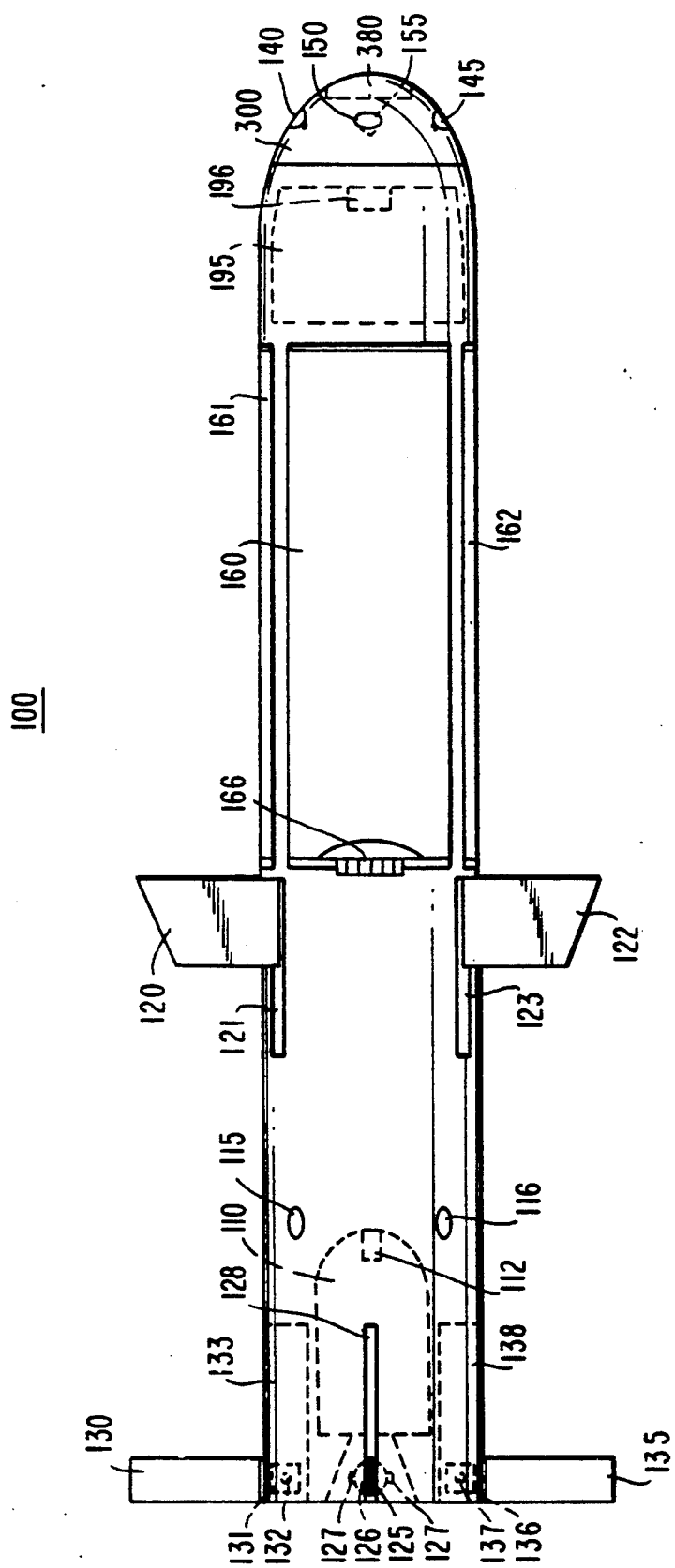
FIG. 1 is a plan view of the preferred missile embodiment of the present invention.

Referring initially to FIG. 1 in the drawings, the preferred missile embodiment of the present invention is generally designated by the reference numeral 100, and components familiar from the prior art include solid fuel propulsion rocket 110 and its igniter 112, and pivotably mounted spring loaded folding winglets 120, 122, each of which is stored in its respective winglet storage slot 121, 123 against spring load prior to launch. Also familiar from the prior art are yaw control surface 125, its pivotably mounted servomotor 126, and the pivots 127 that accommodate storage of yaw control surface 125 in storage slot 128 against spring load prior to launch, and similarly mounted pitch control surfaces 130, 135, their respective servomotors 131, 136, the servomotor pivots 132, 137, and the slots 133, 138 that accommodate storage of the pitch control surfaces against spring load prior to launch. These winglets and control surfaces are pivotably mounted to accommodate shipment, storage, and/or tube launch, and if none of these apply, these aerodynamic surfaces can, of course, be fixed in the positions shown in the drawing. If these folding surfaces are confined to their respective slots by straps or bands for purposes of shipment or storage, these straps or bands will preferably be removed prior to launch, these folding surfaces being confined to their storage slots by only the launch tube bores for missiles that are tube launched, and fully deployed for missiles that are launched otherwise.

The preferred embodiment also includes one or more boost rockets, the exhaust ports 115, 116 of which are shown in FIG. 1. While exhaust ports 115 and 116 imply combustion chambers, igniters, etc., details of these have been omitted to avoid cluttering the drawing with details familiar from the prior art.

Missile 100 is guided toward its target by the perceived acoustic signature of that target, and has for the purpose two pairs of directional microphones, 140, 145, and 150, 155, each microphone preferably spaced the same distance from the adjacent others, each preferably offset the same distance from the principal axis of the missile, and each preferably canted outward with respect to that axis by the same small angle with respect to the direction of flight of the missile, the pair 140, 145 lying on a horizontal line and the pair 150, 155 on a vertical one when the missile is in straight and level flight as shown. Thus a difference in output between microphones 140 and 145, that from 145 being stronger, means that the missile is off course with respect to bearing, and that the target lies off to the right.

Course correction is effected by circuitry that alters the angle of yaw control surface 125 with respect to the missile axis, and in such a way that the difference in output between the microphones 140, 145 decreases. When that difference vanishes the missile is on course at least with respect to bearing. Course errors with respect to altitude are similarly detected and corrected, the output difference between microphones 150, 155 being eliminated by changing the angles of pitch control surfaces 130, 135. The circuitry that effects course correction on the basis of differences in microphone outputs is part of guidance and control package 300, the details of which are described later herein.

Missile 100 can, as mentioned earlier, attack its intended target in several ways: by direct impact, by deploying cables in destructive proximity to the target's rotor blades and/or the pitch adjusting mechanisms for these blades, by deploying the cables in the flight path of the target, etc. The first of these, simple impact, can be augmented by cables that deploy as a result of that impact, and/or by high explosive, shrapnel, armor piercing, or incendiary warheads 195 that are included as an option in the missile package, as is an impact actuated detonator 196. The next two require cable deployment, and that deployment is initiated by the circuitry of guidance and control package 300.

One of the cables of the preferred missile embodiment is housed in cable storage chamber 160, the other two cables being housed in their respective chambers 161, 162, and all of these chambers, their cables, and the details of their deployment, are substantially the same. Because of this similarity, the details of only the chamber 160 are shown in FIGS. 1A, and 1B.

Referring to these drawings and assuming a cable deployment initiation signal from guidance and control package 300, the chamber release mechanism 165, say a solenoid latch or an explosive bolt is actuated, and the forward end of chamber 160 pivots about the hinge 166 that pivotably connects chamber 160 to the body portion 105 of missile 100. Chamber 160 pivots outward with respect to the axis of missile 100, and is initially urged to do so by the spring in spring chamber 167 (or alternately by a pyrotechnic actuator), and is brought to its fully deployed position by aerodynamic forces.

This fully deployed position is one in which the long dimension of the chamber is tilted slightly forward with respect to a transverse plane that includes the pivot axis of hinge 166, further rotation about the hinge being prevented by arm assembly 168, one member of which is pivotably connected to the missile body portion 105, and the other to the forward end of the chamber, the opposite ends of these members being pivotably connected together as shown. Full deployment of chamber 160 is confirmed by the actuation of optional microswitch 169, and that of the others similarly, and cable deployment is initiated by activating the respective cable deployment rocket igniters 181 when these microswitches are actuated, after enough time has elasped to effect chamber deployment, or as response to a signal supplied by guidance and control package 300.

Referring still to FIGS. 1A and 1B, the latter a view looking into the right-hand end of cable storage chamber 160, the cable 170 that attacks the rotating wing aircraft that are the targets of this invention is stored in that chamber in concentric coils, the innermost of which, 171, is preferably one layer deep. The remaining layers, 172, 173, etc., are preferably a collection of pancake coils wound like those shown in *Transformer Engineering*, Blume et al., John Wiley & Sons, Inc., NY 1951, pp 475, 477, but can alternately be wound one layer deep. This stored cable also serves as the launch tube for cable deployment rocket 180, and because this rocket produces hot gases that can damage the coiled cable on their way to the open left end of chamber 160, the inner layer of cable 171 is preferably protected against heat damage, say by ablative coating 175.

In the preferred embodiment, rocket 180 has no active guidance system, and none is needed when cable 170 is connected to the tail portion 182 of rocket 180 by at least three substantially identical lengths of preferably ablatively coated metallic chain or cable 176 as shown in FIG. 1A. In that drawing, each of these lengths 176 is connected to a different point in the same transverse plane of the rocket, with each point the same radial distance from the rocket axis and each equidistant from the adjacent others and, when cable 170, the inner layer 171 of which pays out through its own bore and from left to right, produces the expected drag load on the rocket, the rocket is axi-symmetrically loaded when that cable is being deployed as expected, and by a course-correcting force otherwise.

Cable storage chamber 160 is shown as having two optional subchambers 190 and 195, and these options apply to cable storage chambers 161 and 162 as well. Subchambers 190 and 195 and the corresponding others serve missile 100 in ways that depend upon whether the cables deployed to attack rotating wing aircraft fall free, or are attached to each other and/or to the missile, and also whether deployment of a particular cable is helped or hindered by gravity.

Recalling that FIG. 1 shows missile 100 in straight and level flight en route to its target, it is clear that the cable from chamber 160 is deployed against the pull of gravity and that the deployment of those from chambers 161 and 162 are assisted by gravity. Thus the rocket that deploys the cable from chamber 160 must be more powerful than the others if all cables are the same length and all are expected to attain full deployment simultaneously, and this additional power is preferably provided by a rocket of larger diameter, the cable lost to accomodate this larger diameter being housed in subchamber 190.

Because rocket 180 carries its cable to a higher altitude than do the others, rocket 180 is preferably fitted with a fall retarder such as the drogue parachute 186 to prolong the salvage effect of missile 100 at these altitudes. As shown in the drawing, drogue parachute 185 is stored furled in rocket nosecone 185 until needed, that nosecone being a loose enough fit with respect to the rocket to fall off when the cable is fully deployed, rocket 180 burns out, or a triggering device familiar from the prior art is activated. If cable 170 is arranged to fall free from missile 100 when that cable is fully deployed, this cable is preferably made more effective not only by drogue parachute 186, but also by an impact detonated explosive and/or incendiary charge attached to the missile end of cable 170 and slideably housed in subchamber 195.

In the preferred embodiment, however, the missile end of cable 170 remains attached to the missile as does that from one of the other chambers, say 161, so that the salvage configuration of one portion of the weapon is, in vertically descending order, drogue parachute 186, spent rocket 180, cable 170, missile 100, the cable from cable storage chamber 161, and at the bottom, the spent rocket from that chamber. To accommodate the larger fall retarder needed to make this arrangement more effective, the propulsion part of rocket 180 is preferably made shorter, the deployment capability lost by so doing being restored by an increase in diameter, the portion of cable lost from the main coil 170 by so doing being housed in subchambers 190 and 195. Analogously, an impact detonated incendiary and/or explosive charge can be housed in the forward end of a larger diameter cable deployment rocket in cable deployment chamber 161, the cable length sacrificed to diameter being accommodated in the subchambers as explained earlier.

The cable deployed from chamber 162 preferably falls free of the missile with its missile end preferably terminated in both a fall retarder, say a drogue parachute, and an explosive or incendiary charge, both being slideably housed in the same subchamber prior to deployment, or with one housed in each. Recalling that the cable deployment rocket for this chamber takes a downward path, a second salvage configuration results, with the fall retarder and the incendiary and/or the explosive charge at the top, the spent rocket at the bottom, and the cable between.

The cables deployed by the weapons of this invention compromise their targets as explained earlier, i.e., by breaking and/or fouling rotor blades and/or blade pitch adjusting mechanisms, and cables that are strong enough for the purpose are readily available commercially. These commercially available cables have a higher weight per unit length than is necessary for the use intended here, however, and the special cable embodiments of FIG. 2 that have a lower weight per unit length are preferred. These special cables survive impact by spreading along a greater length of cable the high impulsive forces that would otherwise peak locally. These special cables can be made in the familiar twist or braid configurations, and the twisted versions are shown in FIGS. 2A and 2B, and the braided versions in FIGS. 2C and 2D.

Figure 2A:
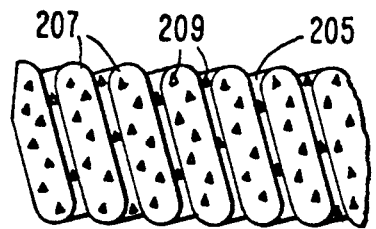
FIG. 2A is a pictorial view of twisted cable in accordance with the present invention.
Figure 2B:
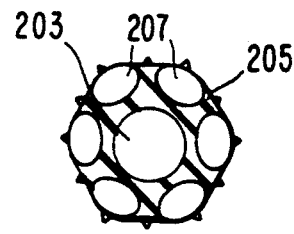
FIG. 2B is a sectional view of the cable shown in FIG. 2A.
Figure 2C:
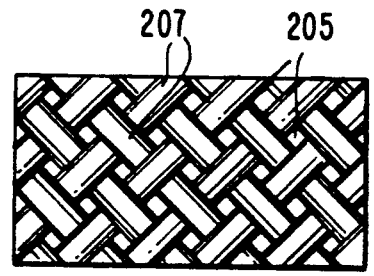
FIG. 2C is a pictorial view of braided cable in accordance with the present invention.
Figure 2D:
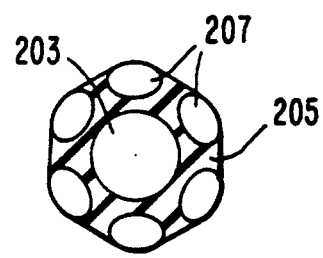
FIG. 2D is a sectional view of the cable shown in FIG. 2C.

Referring now to these drawings, FIG. 2B is a typical transverse section of an embodiment of FIG. 2A, and FIG. 2D is a typical transverse section of an embodiment of FIG. 2C, and the immediately recognizable differences between these embodiments and commerical cable are the high hysteresis rubber or rubber-like material 205 that serves as a spacer between both the adjacent outer strands 207 and these outer strands and the cable core 203, and the shallow helix angles of the outer strands.

These outer strands 207 are the first parts of the cables to be impacted by rotor blades, and each strand 207 is itself preferably a bundle of twisted steel wires that are strong enough and flexible enough to survive cutting by rotor blades, the leading edges of which may have been sharpened for the purpose. The risk of cutting during initial impact is further reduced by the material 205 that permits local transverse movement of the strand or strands first impacted by a blade, and thus changes the nature of the initial impact from one that produces a shear pulse having a high peak of short duration that can sever one or more wires or strands to one that has a lower but longer lasting peak that the cable can survive. The high hysteresis material 205 also reduces the likelihood that the cable will bounce off the blade.

Assuming that both the cable and the blade survive initial impact, and that both remain in contact, the latter because the high hysteresis compound 205 not only inhibits bounce, but also because the high coefficient of friction of that compound inhibits relative motion between the cable and the blade, the cable will begin to wrap about the blade and/or its pitch adjusting mechanism, and inertial effects will again tend to cause high local stresses in the cable. The special cable embodiments of FIG. 2, however, limit this by virtue of the shallow helix angles of the outer strands 207, the compound 205, and the stretchable cores 203.

Compound 205 initially transfers inertial loads to core 203 (typically one or more strands of nylon or other stretchable material), and as core 203 elongates the helix angles of the outer strands increase, and the outer strands 207 compressively load compound 205 and core 203 as they gradually assume their intended tensile load. This gradual loading limits the peak local stresses that would otherwise have to be accommodated by stronger cables having higher weights per unit length. Thus the weight of the warheads of this invention are reduced without compromising their effectiveness.

The drawings of FIG. 2 also show as an optional feature grit particles 209 partially embedded into the outer surfaces of the strands 207, the compound 205, or both. These grit particles, typically carbide compounds, serve not only to inhibit relative motion between cables and blades, but also to damage blades if such motion does occur.

The missile embodiment of FIG. 1 is guided to its target by a guidance and control package bearing the general designation 300, the operation of which is explained with reference to the block diagram FIG. 3.

As mentioned previously, the acoustic signature of the target, a rotating wing aircraft, is sensed by a noncolinear array of acoustic sensors that are preferably the matched set of symmetrically spaced and oriented directional microphones 140, 145, 150, and 155. Because the control surfaces of missile 100, 125 and the pair 130, 135 are orthogonal, the microphone pairs 140, 145 and 150, 155 are preferably similarly arranged, the microphone pair 140, 145 lying in or parallel to the plane of the pitch control surfaces 130, 135, and the pair 150, 155 along a line perpendicular to this plane, the output of the first pair being processed to correct course errors with respect to bearing, and the output of the second pair to correct course errors with respect to altitude. While this arrangement of four microphones is preferred because it facilitates processing errors in bearing separately from those in altitude, persons having ordinary skill in the art will recognize that it requires one more microphone than the minimum needed to effect this three dimensional course correction. This redundancy can, however, accommodate the loss of output from one microphone if circuitry (omitted from the drawing) is included that substitutes one half of the combined output of the orthogonal pair for the lost signal. In either case, the output of each microphone or its previously mentioned equivalent is fed to a corresponding member of the preferably matched set of amplifiers 341, 346, 351, and 356 as shown in the drawing.

Assuming first the benign conditions in which a fixed or slow moving target produces a loud, clear, and well-defined acoustic signature uncontaminated by echoes, gunfire, the acoustic signatures of other aircraft, etc., the outputs of amplifiers 341, 346 could be fed directly to left-right comparitor 343, and the output of that controller would actuate yaw control surface 125 via yaw control surface servomotor 126 and sevomotor driver 348 to correct course error on the basis that the target bearing with respect to the missile flight path is in the direction of the microphone having the stronger output of the pair. Analogously, the outputs of amplifier pair 351, 356 would be fed to up-down comparitor 353 to actuate pitch control surfaces 130 and 135 in tandem in response to substantially identical outputs from servomotors 131 and 136 responding to substantially identical outputs from servomotor drivers 358 and 359 to correct course errors in altitude. Combat conditions are rarely so benign, however, at least partly because targets can be expected to practice survival techniques known to be effective against prior art weaponry, the most effective of these techniques being nap-of-earth flight over sheltering terrain, and in close enough formation so that targets at the rear of that formation ar not put at undue risk from defensive forces alerted to their approach by those in the lead.

Figure 3:
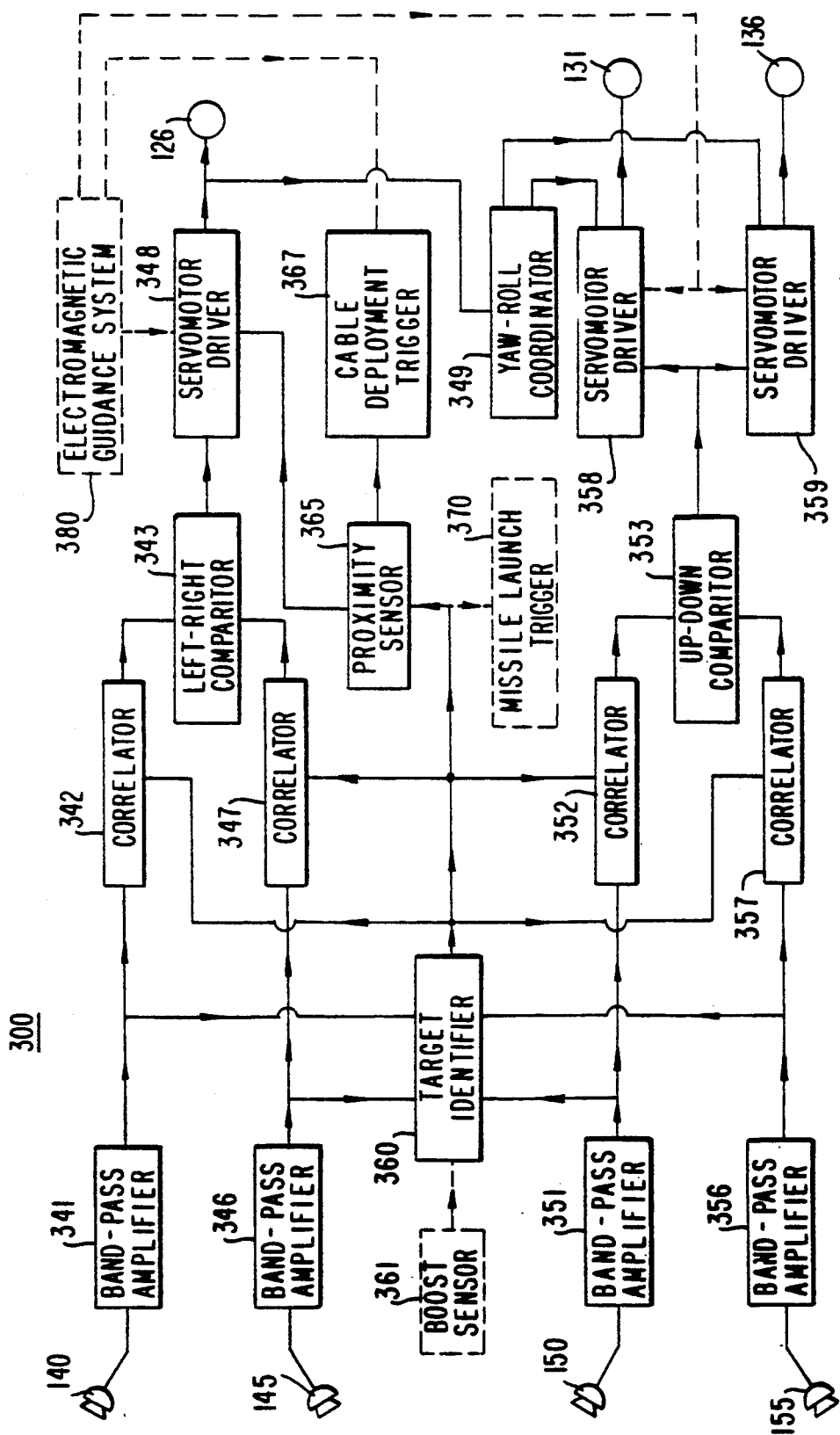
FIG. 3 is a block diagram of an acoustic guidance and control system in accordance with the present invention.

The embodiment of FIG. 3 addresses these survival techniques by identifying a most likely target even when the sheltering terrain for nap-of-earth flight is a canyon having acoustically reflective walls and/or floor, and does so by comparing the spectra of the microphone outputs with spectra previously obtained from known targets, correlating the output of each microphone with relevant portions of the acoustic signature of the target to assure that all course corrections are responsive to the same target, coordinating missile yaw and roll to facilitate tracking, and initiating warhead activation sequences on the basis of the intensity and the rate of change of intensity of the perceived acoustic signature of the target.

Signal processing in accordance with FIG. 3 begins with amplification of the only the target-relevant portions of the microphone outputs, and blocks 341, 346, 351, and 356 are band-pass amplifiers that amplify only those frequencies produced by the rotors of rotary wing aircraft. These amplified signals, digitized by these amplifiers if further processing is to be digital, are then simultaneously fed to target identifier 360 and to the correlators 342, 347, 352, and 357, as shown.

These amplifier outputs are then compared by target identifier 360, not only to find the strongest, but also to confirm that this strongest signal is derived from a suitable target, say by making a frequency analysis, typically a power density spectrum, of this strongest signal and comparing it with previously stored corresponding analyses of enemy rotating wing aircraft. (Circuits for finding frequency spectra are well known, and are, for example, collections of sequentially tuned narrow band fixed frequency filters, tunable narrow band filters, or correlators one input to which is the signal to be analyzed, and the other the output of a sweep oscillator.) Assuming that this strongest signal is identified as coming from an appropriate target, this signal, or for reasons mentioned later herein, only its higher frequency components, becomes the output of target identifier 360 that is fed to correlators 342, 347, 352, and 357. If this strongest signal is not so identified, the amplifier outputs are further examined by target identifier 360, either in tandem or sequentially, depending upon the design of that block, until one that is so identified is found.

Each of the correlators in FIG. 3 has two inputs as shown, one from the corresponding band-pass amplifier and the other from target identifier 360, and, in each of these correlators, one of these inputs is multiplied by the other and the product is integrated over successive half periods of the fundamental of the amplifier output. The outputs of these correlators are the results of these integrations, and those from correlators 342 and 347 are fed to left-right comparitor 343 and those from correlators 352 and 357 are fed to up-down comparator 353 to effect course correction as explained previously.

The correlators of FIG. 3 integrate the products of their inputs in accordance with the well known definite integrals $$\int_0^\pi (\sin kx)(\sin mx)dx = \int_0^\pi (\cos kx)(\cos mx)dx = 0, k \neq m,$$

the results of which are as stated. Thus, because one of the inputs to the correlators is an electronic replica of the acoustic signature of the particular target selected by target identifier 360, and the other is an amplifier output, and only those frequencies that are the same in both can affect the output, the outputs of all of the correlators will be responsive to the same target (and/or its echoes), and the other and previously mentioned distracting signals will be suppressed.

Because these echo-derived signals can, of course, also compromise the guidance systems of this invention they too are also preferably suppressed, say by including in target identifier 360 a fixed or tunable high-pass filter that attenuates the low frequencies that are reflected by the terrain, but passes unattenuated the higher frequencies that are well represented in the acoustic signal that arrives directly from the target, but are not well represented in the echoes because they are absorbed and/or randomly scattered by the terrain.

As mentioned previously, the preferred embodiment of FIG. 1 has separately adjustable pitch control surfaces 130 and 135, a feature that accommodates the turn-and-bank coordination needed to track targets effectively. The signals that produce the angular difference between the pitch control surfaces 130 and 135, that rolls the missle to a bank angle appropriate for its turn angle are supplied to servomotor drivers 358 and 359 by yaw-roll coordinator 349. This yaw-roll coordination can result from a program previously stored in yaw roll coordinator 349 to set the pitch control surfaces to a difference angle proportional to the input to block 349 shown in FIG. 3, by an accelerometer that is included in block 349 and that, like a pilot flying by the seat of his pants, responds to sideslip and adjusts the pitch control surface difference angle to reduce it, or both.

The preferred embodiment also coordinates cable deployment with the direction of missile-target closure because cables that are deployed late from missiles that approach their targets head-on will not be impacted by the rotor blades of their targets, and also because blade-cable impact is less likely when cables are deployed early from missiles that approach their targets from behind. This matter of cable deployment being affected by direction of approach is addressed on the basis of the change in intensity of the acoustic signature of the target as perceived by the proximity sensor 365 of FIG. 3, but first an increase in this in intensity is used to confirm that the missile is closing with respect to its target, and a decrease to send a course reversal signal from proximity sensor 365 to servomotor driver 348 via the path shown.

Signal processing by proximity sensor 365 somewhat parallels that in Owen et al., U.S. Pat. No. 4,409,899. In both, electronic replicas of the perceived target signatures are rectified, the rectifier outputs are differentiated, and warheads are not activated unless rectifier outputs exceed predetermined threshold levels. Here, however, the warhead activation signal is obtained by combining and processing the rectifier output and its derivatives differently.

While cable deployment can be initiates on the basis of rectifier outputs above some arbitrary threshold level, the preferred deployment initiation signal is the zero crossing of the derivative of the curve that is the sum of the rectifier output and its first derivative. Zero crossing triggering is preferred because, as is clear from Owen's FIG. 2, deployment will be earlier when the missile approaches the target head-on and the rapidly changing rectifier output has a derivative large enough to make a significant contribution to the previously mentioned sum, and later when the missile approaches its target from behind, and the slowly changing rectifier output is the dominant term in the sum. This zero crossing triggering can be used to initiate the entire cable deployment sequence, or just the portion of that sequence that begins with activation of rocket igniters 181, the earlier portion of that sequence, deployment of the cable storage chambers but not their cables, being initiated by a rectifier output that is above some threshold level and increasing.

The embodiment of FIG. 3 also includes a power supply for its electronic circuitry that, following conventional practice, has been omitted from the block diagram. This power supply is preferably a battery that is connected, activated, and/or inserted into the missile at the appropriate point in the launch or launch preparation process.

The preferred embodiment of FIG. 3 also includes one or more of the three optional blocks that have dashed boundaries in the drawing. The first of these, electromagnetic guidance system 380, is an optical, radar, or infrared guidance system typical of those used to guide prior art anti-tank and anti-aircraft missiles toward their targets. Such electromagnetic guidance systems are, of course, usable during the entire portion of the missile's flight path in which the target is electromagnetically "visible" (the acoustic system guiding the missile during those portions of the flight path during which the target is hidden from the electromagnetic sensors, say by the terrain), but are preferably used for just the final approach which, of course, includes cable deployment (initiated by a signal sent from block 380 to block 367 via the path shown). This minimal use is presently preferred because it minimizes exposure to prior art countermeasures. In any case, to avoid contradictory guidance signals, the servomotor drivers 348, 358, and 359 are programmed to ignore acoustically derived signals when the electromagnetic guidance system is "locked-on" its targets.

The second optional block is boost sensor 361, typically an accelerometer that turns off the output of target identifier 360 during launch or booster rocket "burn". Boost sensor 361 thus eliminates steering errors that might otherwise be caused by the roar of these preferably high thrust, short burn-time rockets because the correlators 342, 347, 352, and 357 have no output when one of their inputs vanishes.

The third optional block is the missile launch trigger 370 that initiates the missile's launch sequence in response to the perceived acoustic signature of a target, making missile 100 a kind of anti-rotorcraft mine. This block 370 processes the output of target identifier 360 in much the same way that proximity sensor 365 does, but does so to initiate missile launch rather than cable deployment. While this arrangement has the advantage of using much of the guidance circuitry for the "mine" function, both block 370 and this shared circuitry must be powered prior to launch initiation, and this power is preferably provided by an external source that supplies power to block 370 and to those that lie to the left of the correlators in the drawing, but to no others. This limited and externally supplied pre-launch power arrangement reduces pre-launch power requirements, preserves the charge of the missile's on-board battery, prevents pre-launch cable deployment, and eliminates pre-launch wear and tear on the nonpowered portions of the guidance system.

While both the surface-to-air anti-rotorcraft missile embodiments of FIG. 1 and their "mine" embodiments that include block 370 of FIG. 3 have been described in detail, their launchers have not, because suitable launchers and launch arrangements are well represented in the literature, and because the actual launcher and launch arrangements best suited for a particular application are a function of both the kind of military assets to be protected, and the equipment available to do so. Recalling that missile 100 has folding winglets 120, 122 and folding aerodynamic control surfaces 125, 130, and 135 to accommodate missile launch from tubes or otherwise, and referring say to the previously mentioned *Encyclopedia of World Military Weapons*, pages 156-7, 160, 172, 197, 202-4, 206, and 208, enough examples can be found to enable skilled art workers to address the matter of launch without further description here.

Because the acoustic guidance systems of this invention can find targets that are hidden from line-of-sight weapons, and can do so despite the presence of echoes, the acoustic signatures of other weapons, electromagnetic jamming, etc., and the cable type warheads of this invention can change what would otherwise be near misses into direct hits, skilled art workers will recognize that these warheads and systems can serve not only the weapons detailed herein, but also, and either directly or with modifications dictated by the application, others as diverse as bombs and projectiles intended to attack rotating wing and other subsonic aircraft, and torpedoes intended to attack propellor-driven ships and submarines. Thus it is clear that descriptions herein are intended to be illustrative rather than limiting, the scope of this invention being defined by its claims.

I claim:

1. A weapon for attacking a rotating wing aircraft target comprising:
   (a) means for propelling said weapon toward said aircraft,
   (b) an acoustic guidance system for guiding said weapon along at least a portion of the path toward the source of the perceived acoustic signature of said target,
   (c) a warhead at least a portion of which comprises at least one deployable length of cable, and
   (d) means for deploying said length of cable into the expected path of the rotor blades of said target.

2. The weapon of claim 1, wherein said propelling means comprises at least one rocket.

3. The weapon of claim 1 wherein said acoustic guidance system comprises:
   (1) acoustic sensors,
   (2) means for converting to electrical signals the acoustic signals sensed by said acoustic sensors,
   (3) frequency selective amplifiers for selectively amplifying the portions of said electrical signals corresponding to the acoustic signatures of rotating wing aircraft, (4) spectral means for identifying the portion of the outputs of said amplifiers most likely to have been caused by said target, (5) correlators for correlating the outputs of said amplifiers with the output of said means for identifying, (6) comparitors for comparing the outputs of said correlators, and (7) means responsive to the outputs of said comparitors for steering said weapon toward said source of the perceived acoustic signature of said target.

4. The weapon of claim 3, wherein said acoustic sensors and said means for converting to electrical signals comprise four directional microphones each spaced substantially the same distance from the adjacent other, each spaced substantially the same distance from the principal axis of said weapon, and each canted outward the same amount with respect to that axis.

5. The weapon of claim 1, wherein said warhead further comprises an incendiary, armor piercing, high explosive, or shrapnel producing means for attacking said target.

6. The weapon of claim 1, wherein said at least one deployable length of cable comprises a stretchable core, shallow helix angle outer strands, and a rubber or rubber-like material that occupies the spaces between said strands and between said strands and said core.

7. The weapon of claim 6, further comprising grit particles partially embedded into the outer surfaces of said strands, said rubber or rubber-like material, or both.

8. The weapon of claim 1, wherein said at least one deployable length of cable further comprises a fall retarder.

9. The weapon of claim 1, wherein said means for deploying said length of cable into the expected path of the rotor blades of said target comprises a cable deployment rocket the launch sequence of which is triggered when the intensity of the perceived acoustic signature of said target, the derivatives of said intensity, or a combination of both cross a predetermined threshold.

10. The weapon of claim 1, further comprising an electromagnetic guidance system for guiding said weapon for at least a portion of the time during which said target is electromagnetically visible to the sensing portion of said electromagnetic guidance system.

11. The weapon of claim 2, further comprising a means for disabling said acoustic guidance system when said at least one rocket is propelling said weapon.

12. The weapon of claim 1 for use as an anti-rotorcraft "mine", further comprising means for initiating the launch sequence of said weapon when the intensity of the perceived acoustic signature of said target, the derivatives of said intensity, or a combination of both cross a predetermined threshold.

13. A process for attacking a rotating wing aircraft target comprising:
(a) identifying said target by its acoustic signature by means of acoustic sensors;
(b) guiding a weapon toward the perceived source of said acoustic signature by means of an acoustic guidance system; and
(c) deploying a warhead comprising at least one length of cable into the expected path of the rotor blades of said target.

* * * * *